(12) United States Patent
Mierau et al.

(10) Patent No.: US 9,448,692 B1
(45) Date of Patent: Sep. 20, 2016

(54) GRAPHICAL USER INTERFACE FOR DISPLAYING MENU OPTIONS

(71) Applicant: Path Mobile Inc Pte. Ltd., Singapore (SG)

(72) Inventors: Dustin R. Mierau, San Francisco, CA (US); Daniel Davis, San Francisco, CA (US); Ray Ho, San Francisco, CA (US); David Morin, San Francisco, CA (US); Mallory Paine, San Jose, CA (US)

(73) Assignee: Path Mobile Inc PTE. LTD., Singapore (SG)

( * ) Notice: Subject to any disclaimer, the term of this patent is extended or adjusted under 35 U.S.C. 154(b) by 491 days.

(21) Appl. No.: 13/795,853

(22) Filed: Mar. 12, 2013

Related U.S. Application Data (60) Provisional application No. 61/609,855, filed on Mar. 12, 2012.

(51) Int. Cl.
  *G06F 3/00* (2006.01)
  *G06F 3/0481* (2013.01)
  *G06F 3/01* (2006.01)

(52) U.S. Cl.
  CPC .................. *G06F 3/04817* (2013.01)

(58) Field of Classification Search
  None
  See application file for complete search history.

(56) References Cited

U.S. PATENT DOCUMENTS

| | | | | |
|---|---|---|---|---|
| 5,559,944 A * | 9/1996 | Ono | ..................... | G06F 3/0418 715/841 |
| 9,195,368 B2 * | 11/2015 | Kuscher | ................ | G06F 3/0482 |
| 2003/0048309 A1 * | 3/2003 | Tambata | ............ | G01C 21/3664 715/810 |
| 2006/0146166 A1 * | 7/2006 | Abe | ........................ | H04N 5/232 348/333.01 |
| 2007/0094597 A1 * | 4/2007 | Rostom | ........................ | 715/700 |
| 2007/0271528 A1 * | 11/2007 | Park | ....................... | G06F 3/0482 715/810 |
| 2008/0022228 A1 * | 1/2008 | Kwon et al. | ................... | 715/838 |
| 2008/0062141 A1 * | 3/2008 | Chandhri | ....................... | 345/173 |
| 2008/0109751 A1 * | 5/2008 | Fitzmaurice | ........... | G06F 3/0488 715/793 |
| 2009/0019397 A1 * | 1/2009 | Buffet | .................... | G06F 3/0482 715/837 |
| 2009/0183100 A1 * | 7/2009 | Eom | ..................... | G06F 3/0485 715/769 |
| 2010/0269038 A1 * | 10/2010 | Tsuda | ........................... | 715/702 |
| 2010/0306702 A1 * | 12/2010 | Warner | .................. | G06F 3/0482 715/811 |
| 2011/0055760 A1 * | 3/2011 | Drayton | ................. | G06F 3/0482 715/834 |
| 2011/0145765 A1 * | 6/2011 | Yu | .......................... | G06F 3/0482 715/835 |
| 2012/0268361 A1 * | 10/2012 | Shotel et al. | .................. | 345/156 |
| 2012/0306788 A1 * | 12/2012 | Chen | ................... | G06F 3/04883 345/173 |
| 2013/0066964 A1 * | 3/2013 | Odio et al. | ..................... | 709/204 |
| 2013/0080966 A1 * | 3/2013 | Kikin-Gil | .............. | G06F 3/0483 715/776 |

* cited by examiner

*Primary Examiner* — Toan Vu
(74) *Attorney, Agent, or Firm* — Fenwick & West LLP (57) ABSTRACT

A system and a method are disclosed for displaying menu options. A menu icon is displayed on a touch-sensitive screen. In some embodiments, the menu icon is displayed with a feed from a social networking system. In response to detecting a contact with the menu icon, an animation of a plurality of sub-menu icons emanating from the menu icon is displayed. The sub-menu icons move along different predefined paths to different predefined positions. Each sub-menu icon is associated with an interface to post content to a social networking system. In response to detecting a contact with a sub-menu icon, the interface associated with the sub-menu icon is displayed.

16 Claims, 9 Drawing Sheets

┌─────────────────────────────────────────────────────────────┐
│ Display a menu icon at a predefined location of a user interface │ ~ 202
│           displayed on a touch sensitive screen.            │
└─────────────────────────────────────────────────────────────┘
                              │
                              ▼
┌─────────────────────────────────────────────────────────────┐
│              Detect a first contact with the menu icon              │ ~ 204
└─────────────────────────────────────────────────────────────┘
                              │
                              ▼
┌─────────────────────────────────────────────────────────────┐
│ Display a plurality of sub-menu icons emanating from the menu │
│ icon, where each sub-menu icon moves along a predefined path │ ~ 206
│                    to a predefined position.                    │
└─────────────────────────────────────────────────────────────┘

GRAPHICAL USER INTERFACE FOR DISPLAYING MENU OPTIONS

CROSS REFERENCE TO RELATED APPLICATION

This application claims the benefit of U.S. Provisional Application No. 61/609,855, titled "Graphical User Interface for Displaying Menu Options," filed Mar. 12, 2012, which is incorporated by reference in its entirety.

BACKGROUND

1. Field of Art

The disclosure generally relates to computing devices with touch-sensitive surfaces, and more particularly, to computing devices with touch-sensitive surfaces that display user interfaces.

2. Description of the Related Art

It is a significant challenge to design user interfaces for portable computing devices. In particular, due to limited screen sizes, many portable computing devices are restricted in the number of functionalities that they are able to offer their users. Some portable computing devices (e.g., mobile phones) have attempted to resolve such an issue by adding more physical buttons, increasing the sizes of the portable computing devices, increasing physical button densities, overloading the functions of physical buttons, and/or using complex menu systems. Such interfaces, however, are often frustrating to use. For example, increasing the density of physical buttons may cause increased user input errors. As another example, complex menu systems may be confusing for users to operate.

Accordingly, there is a need for more transparent and intuitive user interfaces for portable computing devices that are easy to use, configure, and/or adapt.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. It is noted that wherever practicable similar or like reference numbers may be used in the figures and may indicate similar or like functionality.

Overview

Embodiments of the systems, methods and computer readable storage mediums disclosed herein provide an intuitive graphical user interface for a social networking application on a portable computing device. Such a graphical user interface reduces the cognitive burden on a user and produces a more efficient human-machine interface.

In one embodiment, a menu icon of a social networking application is displayed on a touch-sensitive screen of the portable computing device. In some embodiments, the menu icon is displayed with a feed received from a social networking system associated with the social networking application. In one aspect, responsive to detecting a contact (e.g., via a human finger or stylus) corresponding to a location of the menu icon on the touch-sensitive screen, an animation of a plurality of sub-menu icons emanating from the menu icon is displayed. The sub-menu icons move along different predefined paths to different predefined positions on the touch-sensitive screen. Each sub-menu icon is associated with an interface to post a particular type of content to the social networking system. In response to detecting a contact corresponding to a location of a particular sub-menu icon on the touch-sensitive screen, the interface associated with the sub-menu icon is displayed on the touch-sensitive screen.

Computing Machine Architecture

Figure 1:
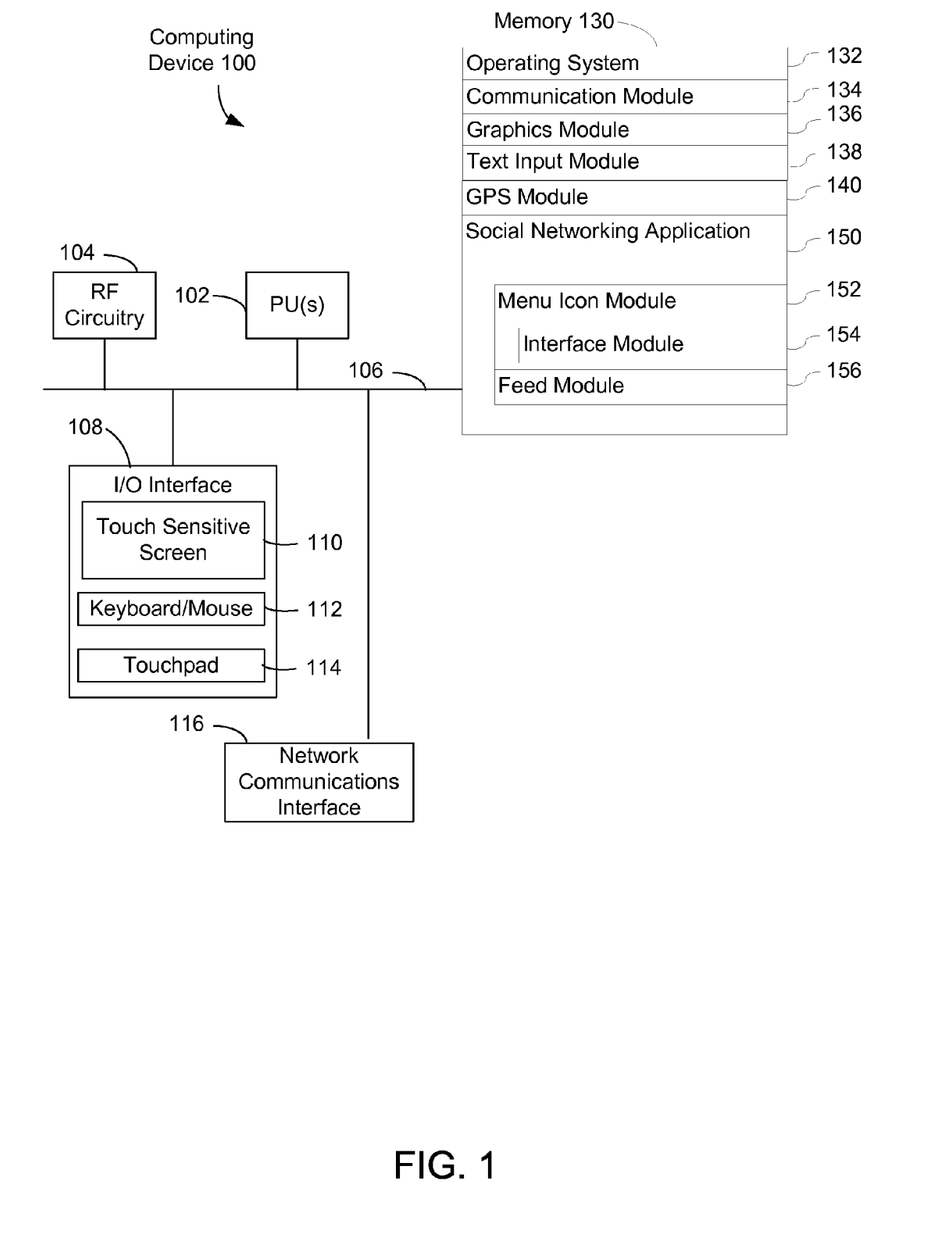
FIG. 1 illustrates one embodiment of components of an example machine able to read instructions from a machine-readable medium and execute them in a processor (or controller).

Referring now to FIG. 1, illustrated is a block diagram of an exemplary computing device 100 with a touch-sensitive display in accordance with some embodiments. Specifically, FIG. 1 shows a diagrammatic representation of a machine in the example form of a computing device 100 within which instructions (e.g., software or program code executable by one or more processing units) for causing the machine to perform any one or more of the methodologies discussed herein may be executed. In some embodiments, the device 100 is a portable communications device such as a mobile telephone that also contains other functions, such as a music player function. In some embodiments, the device 100 is a laptop computer, a desktop computer, a tablet computer, a multimedia player device, a navigation device, an educational device, a gaming system, or a control device (e.g., a home or industrial controller).

The computing device 100 typically includes one or more processing units 102, one or more network or other communications interfaces 116, memory 130, RF circuitry 104, and one or more communication buses 106 for interconnecting these components. The one or more processing units 102 may include a central processing unit, a graphics processing unit (GPU), a digital signal processor (DSP), one or more application specific integrated circuits (ASICs), or any combination of these. The communication buses 106 may include circuitry (sometimes called a chipset) that interconnects and controls communications between system components. The device 100 includes an input/output (I/O) interface 108 comprising a touch-sensitive screen 110. The I/O interface 108 also may include a keyboard and/or mouse (or other pointing device) 112 and a touchpad 114. In some embodiments, the touchpad 114 is a touch-sensitive area of the device 100 that, unlike the touch-sensitive screen 110, does not display visual output. The touchpad 114 may be a touch-sensitive surface that is separate from touch-sensitive screen 110 or an extension of the touch-sensitive surface formed by the touch screen 110.

RF (radio frequency) circuitry 104 receives and sends electromagnetic signals, also called RF signals. RF circuitry 104 converts electrical signals to/from electromagnetic signals and communicates with communications networks and other communications devices via the electromagnetic signals. RF circuitry 104 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 104 may communicate with networks, such as the Internet, also referred to as the World Wide Web (WWW), an intranet and/or a wireless network, such as a cellular telephone network, a wireless local area network (LAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The touch-sensitive screen 110 provides an input interface and an output interface between the device 100 and a user. The touch-sensitive screen 110 displays visual output to the user. The visual output may include graphics, text, icons, video, and any combination thereof. The touch-sensitive screen 110 has a touch-sensitive surface, sensor or set of sensors that accepts input from the user based on haptic and/or tactile contact. The touch-sensitive screen 110 detects contact (and any movement or breaking of the contact) on the touch-sensitive screen 110 and converts the detected contact into interaction with user-interface objects (e.g., one or more soft keys, icons, web pages or images) that are displayed on the touch-sensitive screen 110. In an exemplary embodiment, a point of contact between touch-sensitive screen 110 and the user corresponds to a finger of the user.

The touch-sensitive screen 110 may use LCD (liquid crystal display) technology, LPD (light emitting polymer display) technology, or LED (light emitting diode) technology, although other display technologies may be used in other embodiments. The touch-sensitive screen 110 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive screen 110.

Memory 130 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 130 may optionally include one or more storage devices remotely located from the CPU(s) 102. Memory 130 includes a non-transitory machine-readable medium on which is stored instructions (e.g., software) embodying any one or more of the methodologies or functions described herein. The instructions (e.g., software or program code) may also reside, completely or at least partially, within the memory 130 or within the processing units 102 (e.g., within a processor's cache memory) during execution thereof by the device 100, the memory 130 and the processing unit 102 also constituting machine-readable media.

The term "machine-readable medium" should be taken to include a single medium or multiple media (e.g., a centralized or distributed database, or associated caches and servers) able to store instructions (e.g., instructions). The term "machine-readable medium" shall also be taken to include any medium that is capable of storing instructions (e.g., instructions) for execution by the machine and that cause the machine to perform any one or more of the methodologies disclosed herein. The term "machine-readable medium" includes, but not be limited to, data repositories in the form of solid-state memories, optical media, and magnetic media.

In some embodiments, memory 130 or the computer readable storage medium of memory 130 store the following programs, modules and data structures, or a subset thereof including operating system 132, communication module 134, graphics module 136, text input module 138, GPS module 140, and a social networking application 150.

The operating system 132 (e.g., APPLE iOS, GOOGLE ANDROID, Unix, RED HAT Linux, MICROSOFT WINDOWS, or an embedded operation system) includes various software components and/or drivers for controlling and managing general system tasks (e.g., memory management, storage device control, power management, etc.) and facilitates communication between various hardware and software components.

The communication module 134 facilitates communication with other devices via the one or more communication network interfaces 116 (wired or wireless) and one or more communication networks, such as the Internet, other wide area networks, local area networks, metropolitan area networks, cellular networks, and so on.

The graphics module 136 includes various known software components for rendering and displaying graphics on the touch-sensitive screen 110 or other display. As used herein, the term "graphics" includes any object that can be displayed to a user, including without limitation text, web pages, icons (such as user-interface objects including soft keys), digital images, videos, animations, and the like. The text input module 138 provides soft keyboards or on-screen keyboards for entering text in various contexts. The GPS module 140 determines the location of the device and provides this information for use in various modules or applications (e.g., the modules that provide location-based services such as map/navigation interfaces).

The social networking application 150 includes a menu icon module 152 and a feed module 156. The social networking application 150 communicates with a social networking system in order to send and receive social content. A social networking system comprises one or more computing devices storing a social network. In one embodiment, the social network comprises a plurality of users interconnected by some predefined commonality or commonalities (e.g., social, business, interests, geography, educational, etc.). The social networkings system provides the users of the social network with the ability to communicate and interact with each other, often in connection with the predefined commonality.

Social networking systems allow users to explicitly associate themselves and establish connections with other users of the social networking system. When two users become connected, they are said to be "friends," "contacts," "connections," or "associates" within the context of the social networking system. Generally, being connected in a social networking system allows connected users access to more information about each other than would otherwise be available to unconnected users. Likewise, becoming connected within a social networking system may allow a user greater access to communicate with another user through a communicative interface (internal and external to the social networking system). Being connected may allow a user to access, to view, comment on, download or endorse another user's uploaded content items. The content items may include anything a user can add, upload, post, or send to the social networking system. Content may include textual data (e.g., comment message), location information, photos, videos, music, or other user-generated content.

In one embodiment, the menu icon module 152 displays a menu icon and sub menu icons. The operations of the menu icon module 152 are described in more detail in the discussion of FIG. 2. The menu icon module 152 includes an interface module 154 that display an interface for posting content to a social networking system. The feed module 156 receives a feed from a social networking system and displays the feed in the social networking application 150. The feed includes one or more new stories that describe activities of the users of the social networking system and/or include content posted by users of the social networking system.

Each of the above identified elements in FIG. 1 may be stored in one or more of the previously mentioned memory devices, e.g., memory 130. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 130 may store a subset of the modules and data structures identified above. Furthermore, memory 130 may store additional modules and data structures not described above.

Menu Options Display Process Overview

Figure 2:
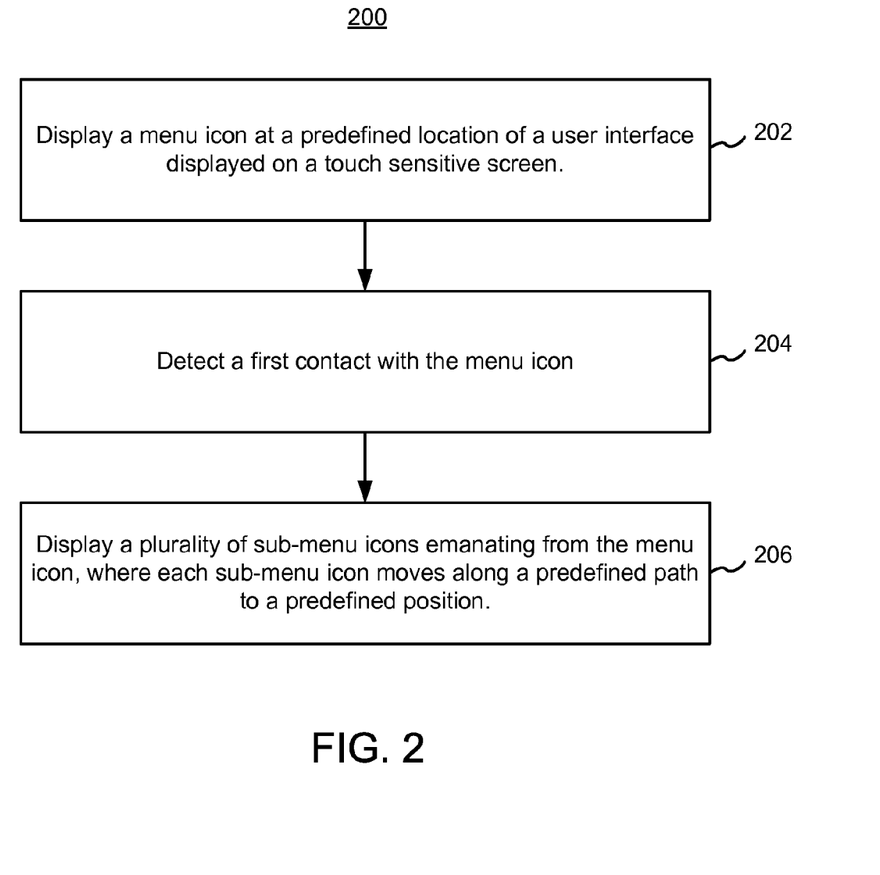
FIG. 2 is a flow chart illustrating a process for displaying menu options, in accordance with an example embodiment.

Turning to FIG. 2, it illustrates a flow chart of a process 200 for displaying menu options, in accordance with one embodiment. The process 200 is performed at a computing device (e.g., computing device 100) having one or more processors and non-transitory memory (e.g., as described with the computing device 100 in FIG. 1). The non-transitory memory, e.g., 130, stores one or more programs to be executed by the one or more processing units 102. The one or more programs include instructions for the process 200.

Figure 3A:
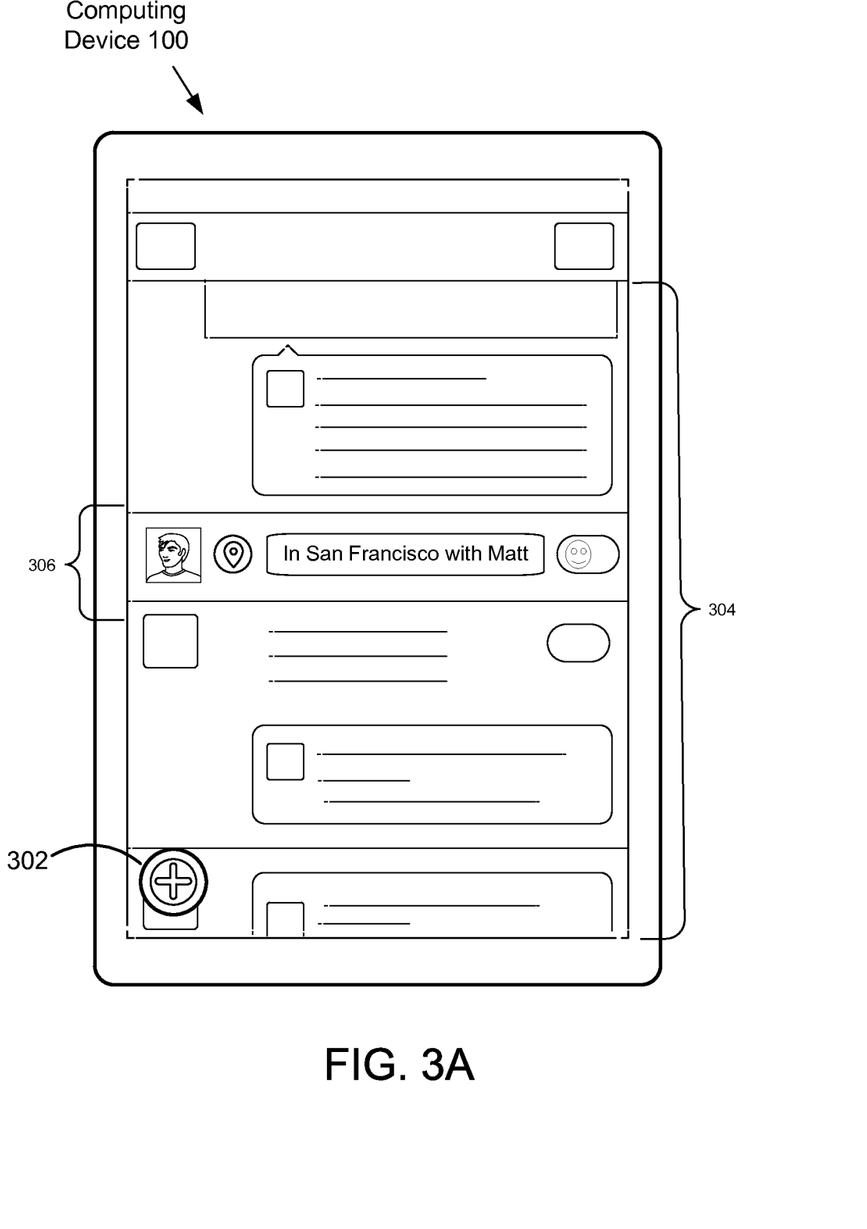
FIGS. 3A-3G illustrates an example of using a menu icon in accordance with some embodiments.

In the process 200, a menu icon is displayed 202 at a predefined location of a touch-sensitive screen. In some embodiments, the menu icon is displayed with a feed from a social networking system. For example, as shown in FIG. 3A, the menu icon 302 may be graphically overlaid over a feed 304 received from a social networking system and displayed on a touch-sensitive screen. The feed may include one or more stories describing activities of users of the social networking system with whom the viewing user has established a connection and/or activities of the viewing user. For example, in FIG. 3A, a news story 306 may indicate where the viewing user is located (e.g., San Francisco) and another user that the viewing user is with (e.g., Matt).

Figure 3B:
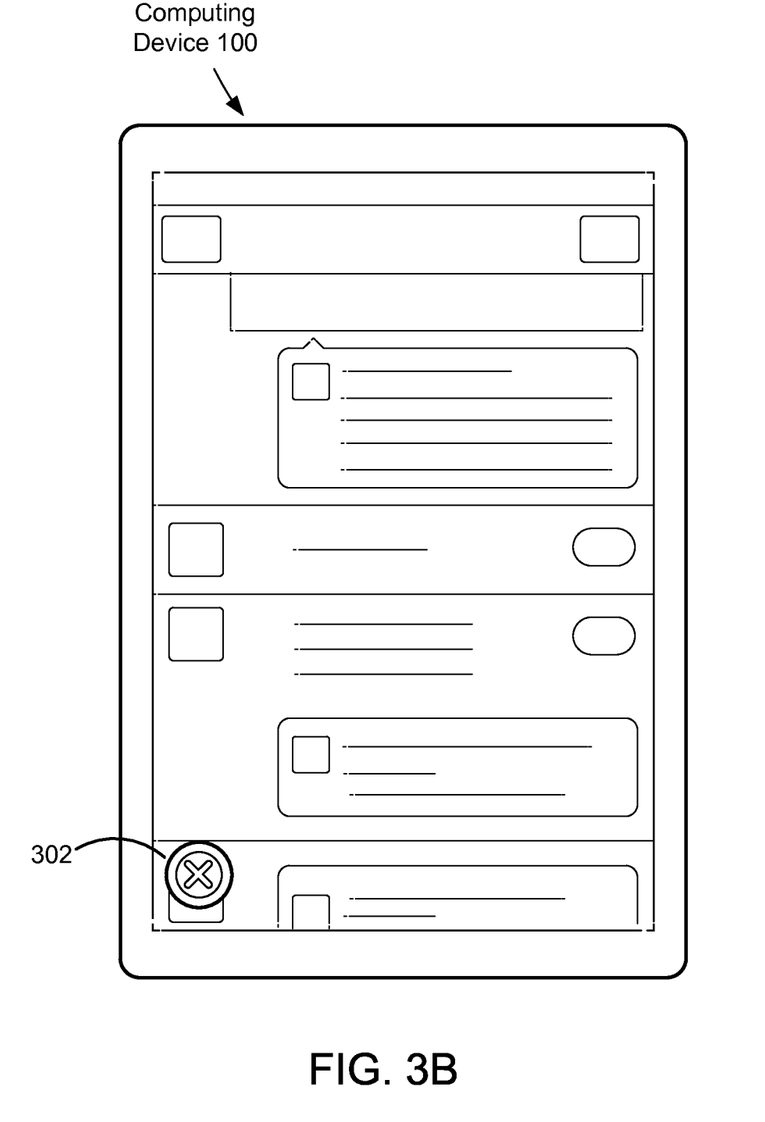

A viewing user's contact (e.g., via finger or stylus) with the menu icon is detected 204. The viewing user's contact may be detected on the touch-sensitive screen at the predefined location where the menu icon is displayed. In some embodiments, in response to detecting the contact at the predefined location, an animation of the menu icon is displayed on the touch-sensitive screen for a predefined period of time. The animation may show the menu icon rotating for the predefined period of time. An example of a rotated menu icon 302 is shown in FIG. 3B.

Also in response to detecting the viewing user's contact with the menu icon, a plurality of sub-menu icons are also displayed 206. In one embodiment, the display of the sub-menu icons may include an animation showing the sub-menu icons as emanating outward from the menu icon, where each sub-menu icon moves along a different predefined path to a different predefined destination position on the user interface of the touch-sensitive screen. In some embodiments, the animation includes displaying the sub-menu icons spiraling out of the menu icon. In some embodiments, at least two of the sub-menu icons move at different speeds. In some embodiments, at least two of the sub-menu icons emanate out from the menu icon at different time intervals. In some embodiments, the sub-menu icons rotate while moving to the predefined positions and stop rotating once they reach the predefined positions. The menu icon 302 does not change position relative to its location on the user interface of the screen, but may rotate clockwise or counter clockwise while the sub-menu icons emanate outward from the menu icon.

Figure 3C:
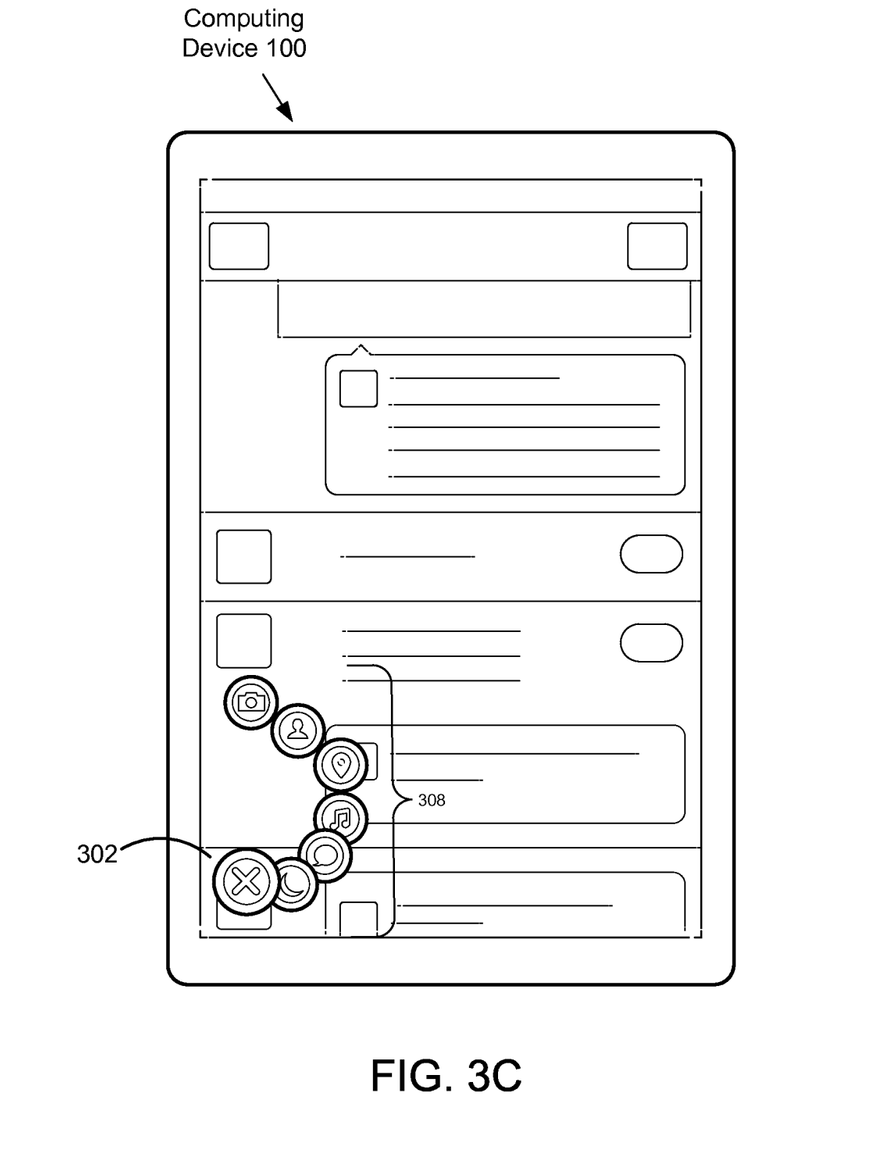
Figure 3D:
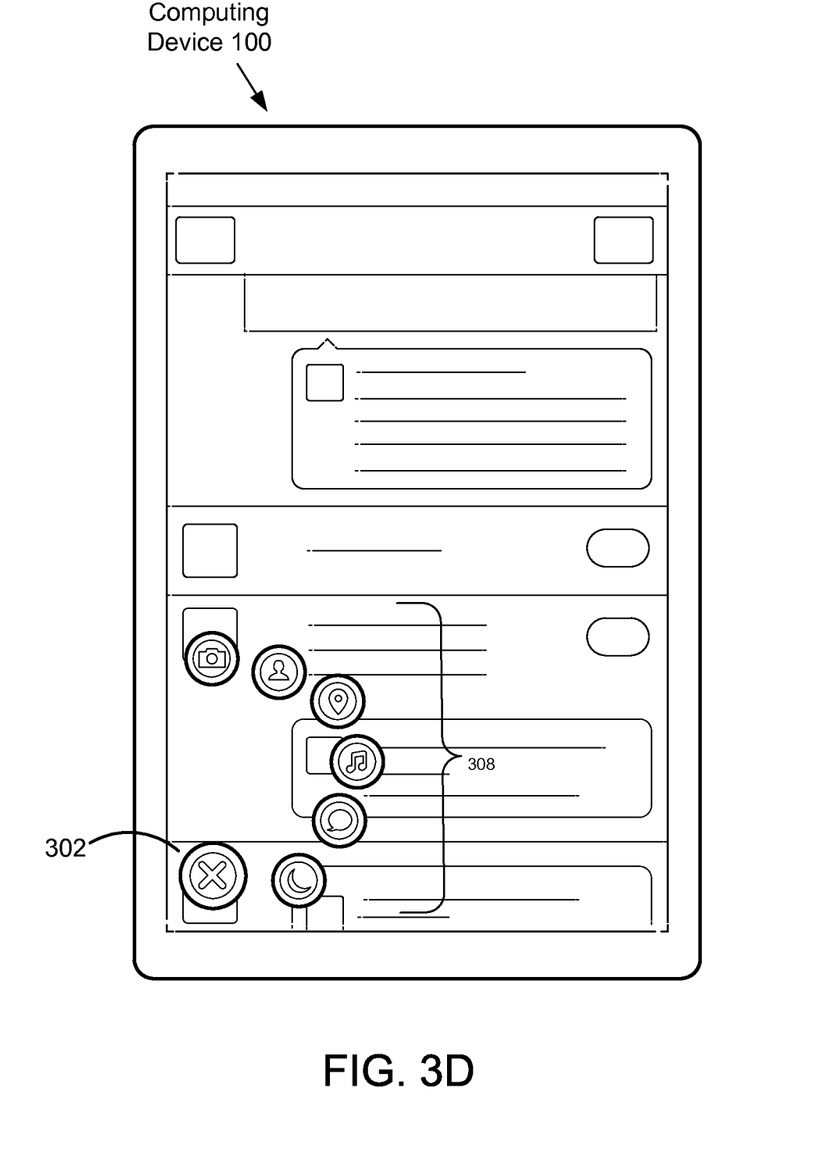
Figure 3E:
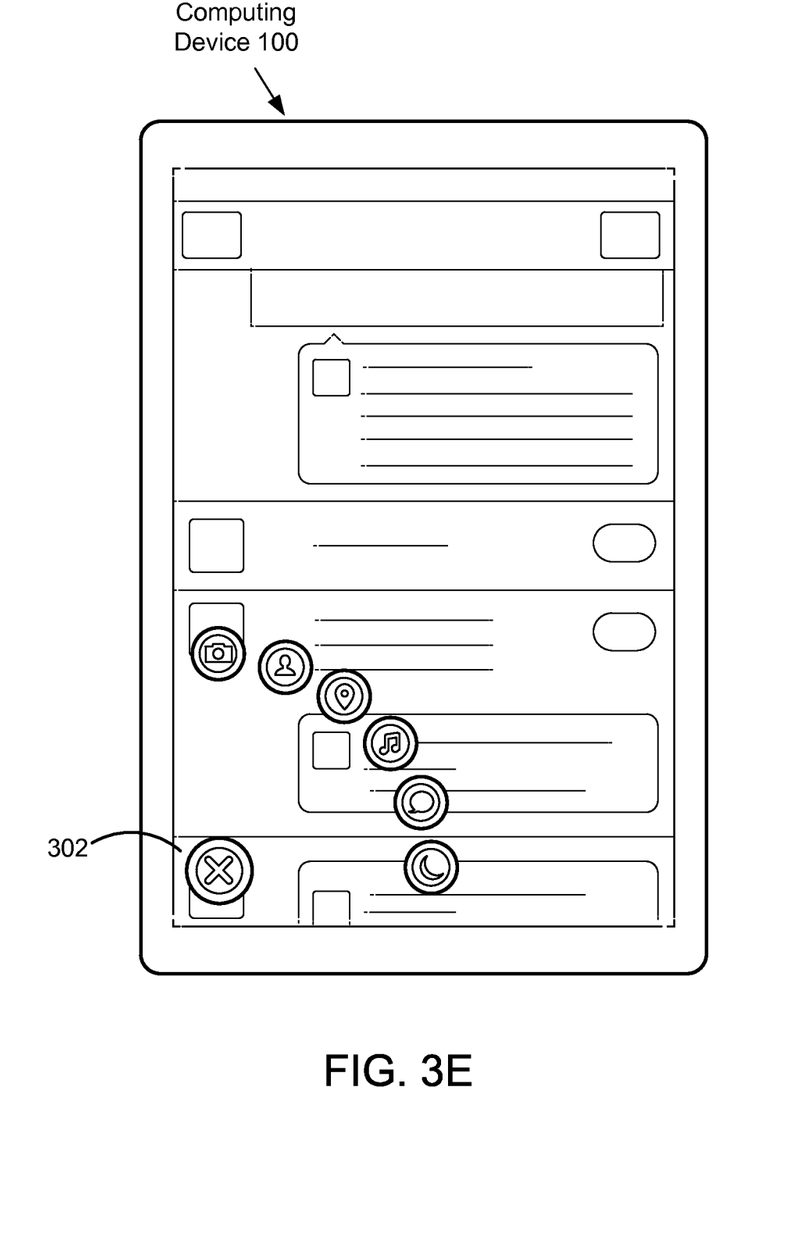

FIGS. 3C, 3D, and 3E together illustrate an example animation of sub-menu icons 308 emanating outward from the menu icon 302 and moving along predefined paths on the user interface of the touch-sensitive screen. In particular, each of the FIGS. 3C, 3D, and 3E show the different sub-menu icons 308 at different positions while moving towards their predefined destination positions. In particular, FIG. 3C shows the positions of the sub-menu icons 308 at a time t1. FIG. 3D shows the positions of the sub-menu icons 308 at a time t2 following t1. FIG. 3E shows the positions of the sub-menu icons 308 at a time t3 following t2.

In some embodiments, while the sub-menu icons are displayed at their predefined destination positions, the sub-menu icons collectively form a curve around the menu icon. Referring again to FIG. 3E, it illustrates an example of the sub-menu icons 308 collectively forming a curve around the menu icon 302. In some embodiments, while the sub-menu icons are displayed at their predefined destination positions, the sub-menu icons do not overlap. In some embodiments, the predefined destination positions of the sub-menu icons are each an equal distance to a portion of the menu icon. For example, the center of each predefined position may be an equal distance to the center of the menu icon.

If the viewing user decides not to use any of the sub-menu icons, the viewing user may collapse the sub-menu icons into the menu icon by making a subsequent contact with the menu icon. If the viewing user makes contact with the menu icon while the sub-menu icons are displayed on the user interface, the sub-menu icons travel back (or return) along the predefined paths toward the menu icon so that once the sub-menu icons return back to the menu icon each sub-menu icon ceases to display on the user interface. In some embodiments, in response to the user contacting the menu icon while the sub-menu icons are displayed, an animation showing the sub-menu icons spiraling into the menu icon is displayed. In some embodiments, in response to the viewing user's contact with the menu icon, the menu icon and the sub-menu icons rotate while the sub-menu icons move towards the menu icon and stop rotating once all of the sub-menu icons are no longer displayed.

The viewing user may also collapse the sub-menu icons into the menu icon by performing a gesture on the touch-sensitive screen. In response to the gesture, an animation is displayed showing the sub-menu icons spiraling or rotating back into the menu icon. In some embodiments, while the sub-menu icons are displayed and in response to detecting a swipe gesture by the viewing user in a substantially vertical direction on the touch-sensitive screen, the plurality of sub-menu icons move toward the menu icon along the predefined paths and each sub-menu icon ceases to display once it reaches the menu icon. The gesture, for example, may be an upward or downward swipe on the touch-sensitive screen. In some embodiments, the sub-menu icons and the menu icon rotate in response to detecting the swipe gesture by the viewing user and continue to rotate until all of the sub-menu icons cease to display.

Figure 3F:
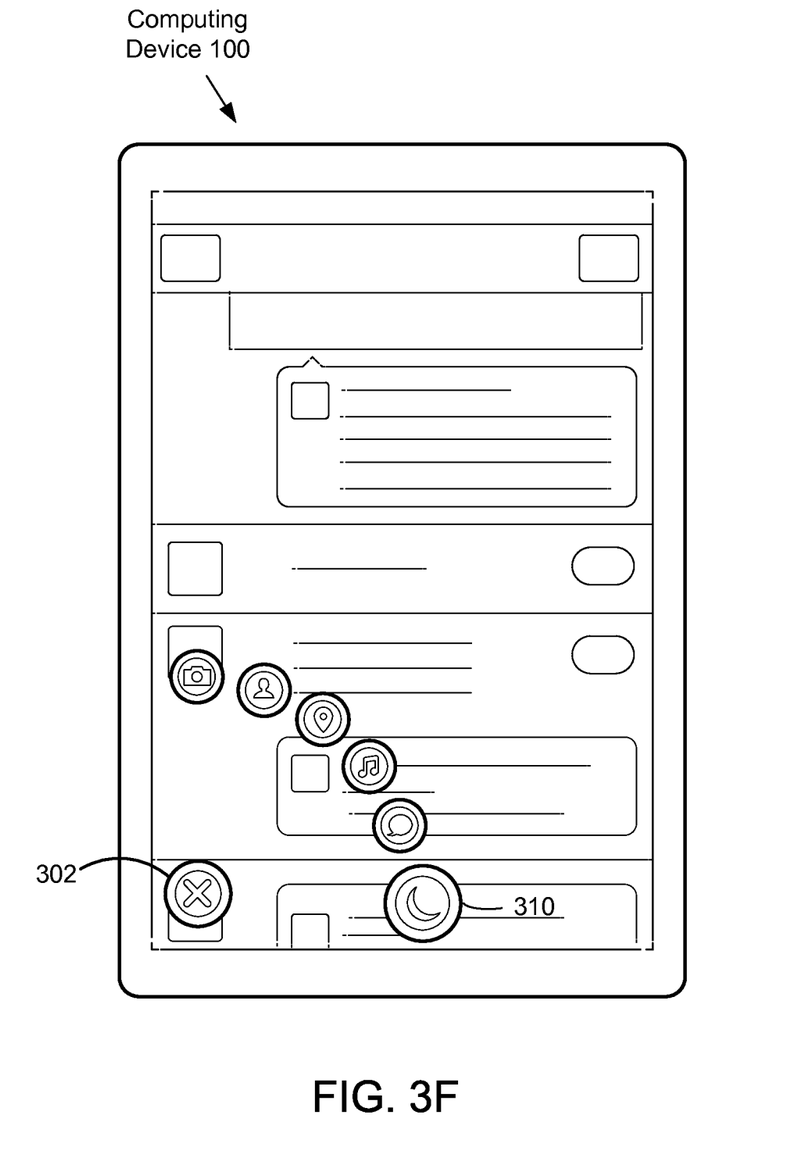

If the viewing user does not collapse the sub-menu icons, the viewing user may make contact with one of the sub-menu icons (e.g., one of 308) in order to access a composer interface associated with that sub-menu icon for posting content to the social networking system. In some embodiments, a user contact is detected at a particular position where one of the sub-menu icons is located. In some embodiments, in response to detection of the user contact, the sub-menu icon corresponding to the user contact is enlarged. Referring to FIG. 3F, it shows a sub-menu icon 310 enlarged relative to the other sub-menu icons in response to a user contact corresponding to the sub-menu icon.

Figure 3G:
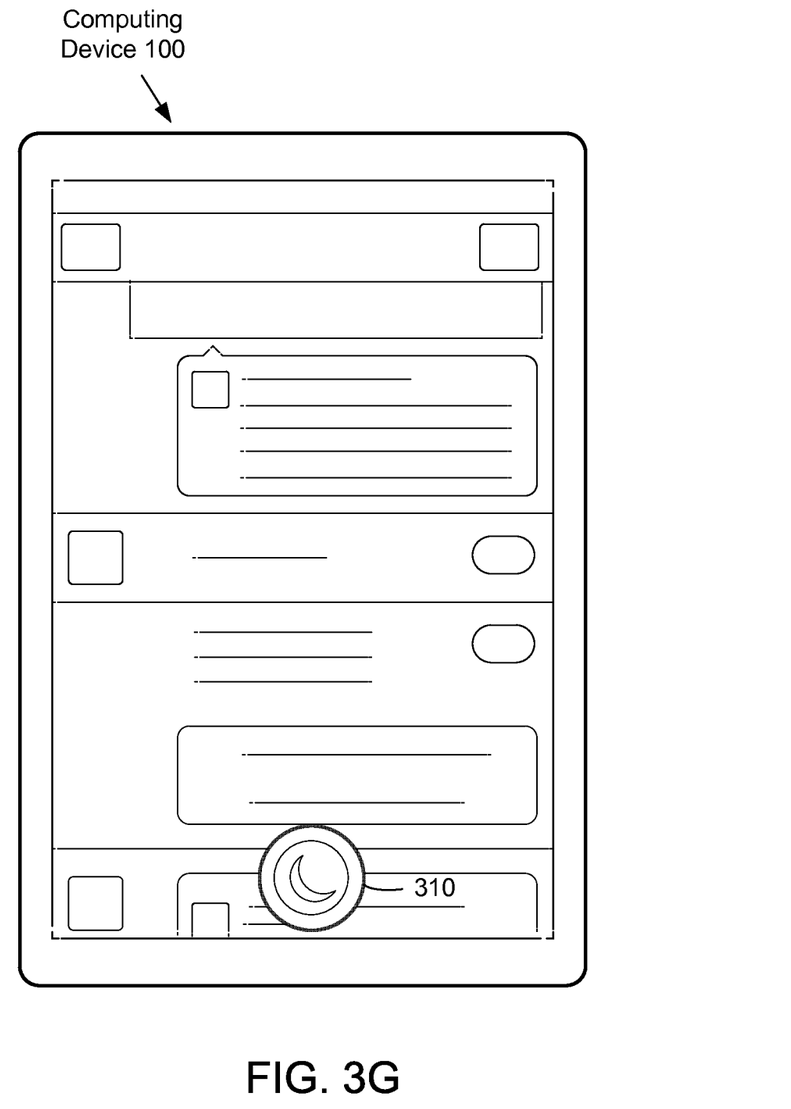

In one embodiment, responsive to the detection of the user contact, the menu icon and the plurality of sub-menu icons other than the enlarged sub-menu icon may cease to be displayed. In some embodiments, the icons other than the selected sub-menu icon fade out as the selected sub-menu icon becomes larger. Referring to FIG. 3G, it shows the icons other than the enlarged sub-menu icon 310 ceasing to display on the touch-sensitive screen.

In some embodiments, responsive to detecting the user contact corresponding to the sub-menu icon, a composer interface associated with the sub-menu icon for posting content to the social networking system is displayed. In some embodiments, the associated composer interface is an interface for posting media items to the social networking system. The media items may include pictures, video files, and audio files. In some embodiments, the associated composer interface is an interface for posting information about the viewing user's location to the social networking system. In some embodiments, the associated composer interface is an interface for posting a message or some other text based content to the social networking system. In some embodiments, the associated interface is an interface for posting information to the social networking system indicating who the viewing user is currently with.

In one aspect, following posting of the information to the social networking system, the information may be distributed to one or more users of the social networking system with which the viewing user is connected over the social networking system (e.g., a picture may be posted to the social networking system and distributed to the friends of the viewing user). The other users may view the information, and/or interact with the information (e.g., comment on the information, indicate an affinity for the information, etc.)

As described herein, the disclosed configurations advantageously provide an intuitive menu system that uses a minimal amount of screen space, reduces the cognitive burden on a user, and produces a more efficient human-machine interface.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a menu icon through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method, comprising:
   displaying, at a computing device with a touch-sensitive screen, a menu icon on a user interface displayed on the touch-sensitive screen, wherein the menu icon indicates a first status that there are a plurality of sub-menu icons to be emanated;
   detecting, on the touch-sensitive screen, a first contact corresponding to the menu icon;
   in response to detecting the first contact corresponding to the menu icon:
      animating a display of the plurality of sub-menu icons emanating outward from the menu icon, the animation including displaying each sub-menu icon from the plurality of sub-menu icons moving along a different predefined path from a menu position where the menu icon is displayed in the user interface to a different predefined position in the user interface, at least one of the plurality of sub-menu icons being associated with a composer interface to post content to a social networking system;
      during the animating of the display of the plurality of sub-menu icons, rotating the menu icon around a center point included in the menu icon to indicate a second status that the plurality of sub-menu icons are emanating, the second status different from the first status; and
      after the animating of the display of the plurality of sub-menu icons, stopping the rotating of the menu icon and displaying a rotated menu icon indicating a third status that the emanating of the plurality of sub-menu icons is complete, the third status different from the first status and the second status;
   detecting, on the touch-sensitive screen, a second contact corresponding to a sub-menu icon from the plurality of sub-menu icons; and
   in response to detecting the second contact corresponding to the sub-menu icon:
      animating the sub-menu icon corresponding to the second contact to indicate a fourth status that the sub-menu icon corresponding to the second contact is selected, the fourth status different from the first status, the second status and the third status;
      removing from display on the user interface additional sub-menu icons from the plurality of sub-menu icons, wherein the additional sub-menu icons do not correspond to the second contact; and
      providing an interface corresponding to the selected sub-menu icon.

2. The computer-implemented method of claim 1, wherein the sub-menu icon corresponding to the second contact is associated with the composer interface and the provided interface is the composer interface.

3. The computer-implemented method of claim 1, wherein animating the sub-menu icon corresponding to the second contact comprises enlarging the sub-menu icon corresponding to the second contact.

4. The computer-implemented method of claim 1, further comprising rotating the plurality of sub-menu icons as the plurality of sub-menu icons emanate outward from the menu icon.

5. The computer-implemented method of claim 1, wherein animating the display of the plurality of sub-menu icons includes displaying at least two of the plurality of sub-menu icons emanating from the menu icon at different speeds.

6. The computer-implemented method of claim 1, wherein the composer interface is an interface for posting media items to the social networking system.

7. The computer-implemented method of claim 1, wherein the composer interface is an interface for posting information about a viewing user's location to the social networking system.

8. The computer-implemented method of claim 1, wherein the composer interface is an interface for posting information about media items a viewing user is consuming.

9. The computer-implemented method of claim 1, further comprising displaying a feed on the user interface, the feed including a plurality of stories, wherein a story from the plurality of stories describes an activity by at least one user of the social networking system with whom a viewing user of the user interface has established a connection over the social networking system.

10. A non-transitory computer readable storage medium for displaying menu options, the non-transitory computer-readable storage medium storing instructions that when executed cause at least one processor to:
   display a menu icon on a user interface displayed on a touch-sensitive screen, wherein the menu icon indicates a first status that there are a plurality of sub-menu icons to be emanated;
   detect, on the touch-sensitive screen, a first contact corresponding to the menu icon;
   in response to detection of the first contact corresponding to the menu icon:
      animate a display of the plurality of sub-menu icons emanating outward from the menu icon, the animation including displaying each sub-menu icon from the plurality of sub-menu icons moving along a different predefined path from a menu position where the menu icon is displayed in the user interface to a different predefined position in the user interface, at least one of the plurality of sub-menu icons being associated with a composer interface to post content to a social networking system;
      rotate the menu icon around a center point included in the menu icon to indicate a second status that the plurality of sub-menu icons are emanating, the menu icon rotated during the animating of the display of the plurality of sub-menu icons, the second status different from the first status; and stop the rotating of the menu icon and display a rotated menu icon after the animating of the display of the plurality of sub-menu icons, the rotated menu icon indicating a third status that the emanating of the plurality of sub-menu icons is complete, the third status different from the first status and the second status detect, on the touch-sensitive screen, a second contact corresponding to a sub-menu icon from the plurality of sub-menu icons; and in response to detections of the second contact corresponding to the sub-menu icon:

animate the sub-menu icon corresponding to the second contact to indicate a fourth status that the sub-menu icon corresponding to the second contact is selected, the fourth status different from the first status, the second status and the third status;

remove from display on the user interface additional sub-menu icons from the plurality of sub-menu icons, wherein the additional sub-menu icons do not correspond to the second contact; and provide an interface corresponding to the selected sub-menu icon.

11. The non-transitory computer readable storage medium of claim 10, wherein the wherein the sub-menu icon corresponding to the second contact is associated with the composer interface and the provided interface is the composer interface.

12. The non-transitory computer readable storage medium of claim 10, wherein animating the sub-menu icon corresponding to the second contact comprises enlarging the sub-menu icon corresponding to the second contact.

13. The non-transitory computer-readable storage medium of claim 10, wherein the instructions for the animation of the display of the plurality of sub-menu icons comprise instructions that when executed cause the at least one processor to display at least two of the plurality of sub-menu icons emanating from the menu icon at different speeds.

14. A computing device comprising:

a non-transitory computer-readable storage medium storing executable computer program instructions comprising instructions for:

displaying a menu icon on a user interface displayed on a touch-sensitive screen, wherein the menu icon indicates a first status that there are a plurality of sub-menu icons to be emanated;

detecting, on the touch-sensitive screen, a first contact corresponding to the menu icon;

in response to detecting the first contact corresponding to the menu icon, animating a display of the plurality of sub-menu icons emanating outward from the menu icon, the animation including displaying each sub-menu icon from the plurality of sub-menu icons moving along a different predefined path from a menu position where the menu icon is displayed in the user interface to a different predefined position in the user interface, at least one of the plurality of sub-menu icons being associated with a composer interface to post content to a social networking system;

during the animating of the display of the plurality of sub-menu icons rotating the menu icon around a center point included in the menu icon to indicate a second status that the plurality of sub-menu icons are emanating, the second status different from the first status; and after the animating of the display of the plurality of sub-menu icons, stopping the rotating of the menu icon and displaying a rotated menu icon indicating a third status that the emanating of the plurality of sub-menu icons is complete, the third status different from the first status and the second status;

detecting, on the touch-sensitive screen, a second contact corresponding to a sub-menu icon from the plurality of sub-menu icons; and in response to detecting the second contact corresponding to the sub-menu icon:

animating the sub-menu icon corresponding to the second contact to indicate a fourth status that the sub-menu icon corresponding to the second contact is selected, the fourth status different from the first status, the second status and the third status;

removing from display on the user interface additional sub-menu icons from the plurality of sub-menu icons, wherein the additional sub-menu icons do not correspond to the second contact; and providing an interface corresponding to the selected sub-menu icon; and a processor for executing the computer program instructions.

15. The computing device of claim 14, wherein the sub-menu icon corresponding to the second contact is associated with the composer interface and the provided interface is the composer interface.

16. The computing device of claim 14, wherein animating the display of the plurality of sub-menu icons includes displaying at least two of the plurality of sub-menu icons emanating from the menu icon at different speeds.

* * * * *